(12) United States Patent
Fazzio et al.

(10) Patent No.: US 7,579,753 B2
(45) Date of Patent: Aug. 25, 2009

(54) TRANSDUCERS WITH ANNULAR CONTACTS

(75) Inventors: R. Shane Fazzio, Loveland, CO (US); Walter Dauksher, Fort Collins, CO (US); Atul Goel, Fort Collins, CO (US)

(73) Assignee: Avago Technologies Wireless IP (Singapore) Pte. Ltd., Singapore (SG)

( * ) Notice: Subject to any disclaimer, the term of this patent is extended or adjusted under 35 U.S.C. 154(b) by 195 days.

(21) Appl. No.: 11/604,478

(22) Filed: Nov. 27, 2006

(65) Prior Publication Data

US 2008/0122320 A1    May 29, 2008

(51) Int. Cl.
    *H01L 41/08*    (2006.01)
(52) U.S. Cl. .................. 310/324; 310/322; 310/366; 367/141; 381/173; 381/190
(58) Field of Classification Search .................. 310/334, 310/320, 365–366, 324; 381/173, 190–191; 367/141
See application file for complete search history.

(56) References Cited

U.S. PATENT DOCUMENTS

| | | | | |
|---|---|---|---|---|
| 2,875,355 | A | * | 2/1959 | Petermann .................. 310/334 |
| 2,943,278 | A | * | 6/1960 | Mattiat .................. 310/366 |
| 2,976,501 | A | | 3/1961 | Mattiat |
| 3,384,767 | A | * | 5/1968 | Arnold et al. ................. 310/366 |
| 4,129,799 | A | | 12/1978 | Green |
| 4,529,904 | A | * | 7/1985 | Hattersley .................. 310/318 |
| 4,868,446 | A | * | 9/1989 | Kumada .................. 310/323.02 |
| 4,985,926 | A | | 1/1991 | Foster |
| 5,663,505 | A | * | 9/1997 | Nakamura .................. 73/702 |
| 5,784,340 | A | * | 7/1998 | Kanai .................. 367/140 |
| 5,814,922 | A | | 9/1998 | Uchino et al. |
| 6,040,654 | A | | 3/2000 | Le Letty |
| 6,346,764 | B1 | | 2/2002 | Boyd |
| 6,362,559 | B1 | | 3/2002 | Boyd |
| 6,667,566 | B2 | | 12/2003 | Kim et al. |
| 6,919,669 | B2 | | 7/2005 | Bryant et al. |
| 7,224,105 | B2 | | 5/2007 | Onishi et al. |
| 2002/0030424 | A1 | | 3/2002 | Iwata |
| 2005/0194867 | A1 | | 9/2005 | Kawakubo |
| 2008/0122317 | A1 | * | 5/2008 | Fazzio et al. .................. 310/328 |
| 2008/0122320 | A1 | | 5/2008 | Fazzio |

FOREIGN PATENT DOCUMENTS

CA    2268415    10/2000
EP    451533 A1 * 10/1991

OTHER PUBLICATIONS

Ried, Robert P., et al., "Piezoelectric Microphone with On-Chip CMOS Circuits", Journal of Microelectromechanical Systems, vol. 2, No. 3, Sep. 1993, pp. 111-120.

Loeppert, Peter V., et al., "SiSonic—The First Commercialized MEMS Microphone", Solid-State Sensors, Actuators, and Microsystems Workshop, Hilton Head Island, South Carolina, Jun. 4-8, 2006, pp. 27-30.

Niu, Meng-Nian, et al., "Piezoelectric Biomorph Microphone Built on Micromachined Parylene Diaphragm", Journal of Microelectromechanical Systems, vol. 12, No. 6, Dec. 2003, pp. 892-898.

* cited by examiner

*Primary Examiner*—Jaydi SanMartin

(57) ABSTRACT

An electronic device and transducer structures are described.

22 Claims, 6 Drawing Sheets

TRANSDUCERS WITH ANNULAR CONTACTS

BACKGROUND

Microphones (mics) are provided in a wide variety of electronic applications. As the need to reduce the size of many components continues, the demand for reduced-size mics continues to increase as well. This has lead to comparatively small mics, which may be micromachined according to technologies such as micro-electromechanical systems (MEMS) technology.

One type of mic is a micromachined piezoelectric mic. The piezoelectric mic includes a layer of piezoelectric material between two conductive plates (electrodes). An acoustic wave incident on the membrane of the mic results in the application of a time varying force to the piezoelectric material. Application of this force to a piezoelectric material results in induced stresses in the piezoelectric material, which in-turn creates a time-varying voltage signal across the material. This time-varying voltage signal may be measured by sensor circuits to determine the characteristics of the incident acoustic wave. Alternatively, this time-varying voltage signal may produce a time-varying charge that is provided to sensor circuits that process the signal and determine the characteristics of the incident acoustic wave.

The capacitance of a piezoelectric mic may be represented:

$$C = \frac{A \kappa \varepsilon_0}{d}, \quad \text{(Eqn. 1)}$$

where A is the common area of the (plate) electrodes of the mic, $\kappa$ is the dielectric constant of the piezoelectric material, $\varepsilon_o$ is the electrical permittivity of free space and d is the separation distance between the plate electrodes of the mic.

As is known, charge across a capacitor may be represented $$Q = C \cdot V \quad \text{(Eqn. 2)}$$

In a piezoelectric mic, capacitance is substantially fixed, and the voltage varies, thereby resulting in a change in charge according to the relation:

$$\Delta Q = C \Delta V \quad \text{(Eqn. 3)}$$

As is known, there is a need to provide suitable sensitivity with the mic. This proves an ever-increasing challenge with smaller mics. From Eqn. 1, it can be appreciated that by reducing the distance (d) and increasing the dielectric constant ($\kappa$) of the piezoelectric material the capacitance of a piezoelectric mic can be comparatively large. The higher level of capacitance of a piezoelectric mic may simplify sensor signal processing circuit design.

While piezoelectric mics are useful in certain applications, there are drawbacks to known piezoelectric mics. For example, assuming that the c-axis of the piezoelectric material does not significantly change across the membrane of the mic, the voltage sensitivity (V/q) couples through the lateral stress, $\sigma_y$, and is ideally proportional thereto. Moreover, in an ideal clamped, thin plate piezoelectric mic under uniform load, there are at least two regions of differing curvature.

In a first region, the top of the piezoelectric layer may be in compressive stress (negative lateral stress), and the bottom of the piezoelectric layer may be in tensile stress (positive lateral stress). Consequently, this first region has a first voltage polarity. In a second region, the top of the piezoelectric layer may be in tensile stress, and the bottom of the piezoelectric layer may be in compressive stress. Consequently, this second region has a second voltage polarity that is opposite the polarity of the first region. If the mic has an upper electrode continuous across both the first and second regions and a lower electrode continuous across the first and second regions, then the opposite polarities of the first and second region may result in a normalization of charge (and hence electrical potential difference) across the first and second regions. This charge normalization can result in a lower sensitivity. As will be appreciated, this reduction in sensitivity is undesirable, especially in comparatively small-dimension mics.

There is a need, therefore, for a transducer structure and an electronic device that address at least the shortcomings described above.

SUMMARY

In accordance with an illustrative embodiment, a transducer structure includes an upper annular electrode; a lower annular electrode; and a layer of piezoelectric material disposed between the upper and lower electrodes, wherein the upper and lower annular electrodes each comprise a plurality of sections, which are separated by section gaps.

In accordance with an illustrative embodiment, a transducer structure includes an upper inner electrode; an upper outer electrode; a lower inner electrode; a lower outer electrode; and a layer of piezoelectric material disposed between the upper electrodes and the lower electrodes. An upper gap is provided between the upper inner electrode and the upper outer electrode; and a lower gap is provided between the lower inner electrode and the lower outer electrode.

In accordance with another illustrative embodiment, an electronic device comprises a transducer. The transducer includes an upper inner electrode; an upper outer electrode; a lower inner electrode; a lower outer electrode; and a layer of piezoelectric material disposed between the upper electrodes and the lower electrodes. An upper gap is provided between the upper inner electrode and the upper outer electrode; and a lower gap is provided between the lower inner electrode and the lower outer electrode.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DEFINED TERMINOLOGY

The terms 'a' or 'an', as used herein are defined as one or more than one.

The term 'plurality' as used herein is defined as two or more than two.

DETAILED DESCRIPTION

In the following detailed description, for purposes of explanation and not limitation, specific details are set forth in order to provide a thorough understanding of example embodiments according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of materials and methods may be omitted so as to avoid obscuring the description of the illustrative embodiments. Nonetheless, such materials and methods that are within the purview of one of ordinary skill in the art may be used in accordance with the illustrative embodiments. Such materials and methods are clearly within the scope of the present teachings.

The piezoelectric mics of the representative embodiments are contemplated for use in a variety of electronic devices. A representative electronic device may be a portable device such as a mobile phone, a camera, a video camera, a personal digital assistant (PDA), a sound recording device, a laptop computer, a tablet computer, a handheld computer, a handheld remote, or an electronic device that comprises the functionality of one or more of these devices. It is emphasized that the noted devices are merely illustrative and that other devices are contemplated. In some representative embodiments, the electronic device is a device that benefits from a microphone structure having a plurality of microphones, with at least one microphone optionally being adapted to function in more than one mode.

In many representative embodiments, the electronic devices are portable. However, this is not essential. In particular, the microphone structures of the present teachings are also contemplated for use in devices/apparatuses that are substantially stationary; and in devices/apparatuses that are mobile, but in which the microphone structures remain substantially stationary. For example, the microphone structures of representative embodiments may be used in industrial machinery applications, motor vehicle applications, aircraft applications, and watercraft applications, to name only a few.

Additionally, while the present description is drawn primarily to microphones, the present teachings contemplate applications to transducers in general. For example, as one of ordinary skill in the art will readily appreciate, the present teachings may be applied to piezoelectric speakers.

Figure 1A:
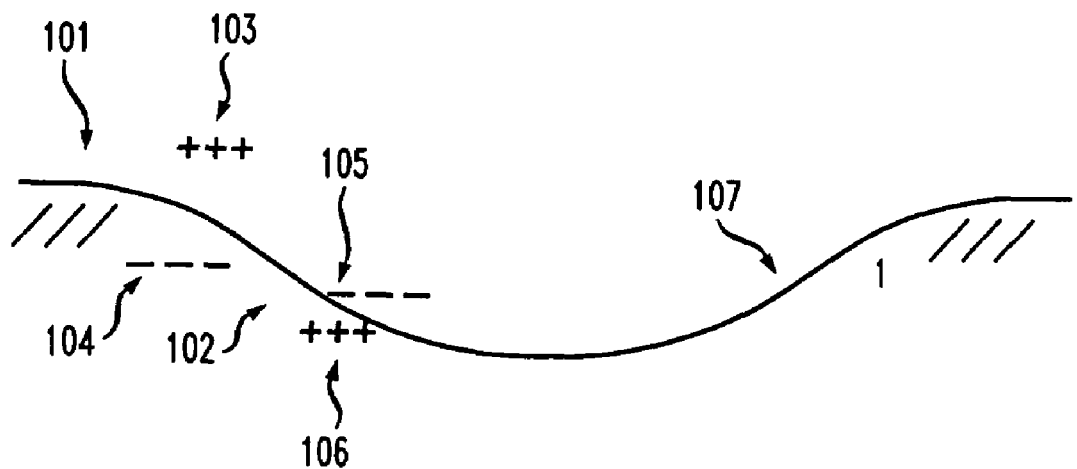
FIG. 1A is a conceptual view of a portion of a piezoelectric mic in accordance with a representative embodiment.

FIG. 1A is a conceptual view of a portion of a piezoelectric mic in an essentially ideal thin-plate representation in cross-section in accordance with a representative embodiment. The mic comprises a piezoelectric layer 101, which may be clamped. Electrodes are disposed over the piezoelectric layer 101, but are not shown to more clearly convey certain aspects of the present teachings.

As the piezoelectric layer 101 oscillates in response to a mechanical perturbation (e.g., a sound wave), the forces generated by the perturbation induce stresses in the piezoelectric layer resulting in generation of a voltage difference across the electrodes. Assuming the layer 101 of piezoelectric material (e.g., AlN, ZnO or lead zirconium titanate (PZT)) has a c-axis substantially orthogonal to the membrane surface, the voltage sensitivity is proportional to the lateral stress, $\sigma_y$, and the ratio of the piezoelectric strain matrix coefficient ($d_{31}$) and the electric permittivity coefficient ($\in_{33}$).

In the present example, the layer 101 has inflection points 102, 107. In regions away from the inflection points 102, 107, the lateral stress can be a positive lateral stress (tensile stress) or a negative lateral stress (compressive stress). For instance, in region 103, the upper surface of layer 101 is subject to a tensile stress and in region 104, the lower surface of layer 101 is subject to a compressive stress. Similarly, in region 106 the lower surface of layer 101 is subject to a tensile stress, and in region 105 the upper surface of layer 101 is subject to a compressive stress. As such, in the present example, region 103 has a net charge due to the piezoelectric effect, and region 104 has a net opposite charge; region 105 has a net charge and region 106 has a net opposite charge. If the upper and lower electrodes were continuous over the upper and lower surfaces of layer 101, respectively, then, as noted previously, charge normalization may occur between regions 103, 105 and regions 104, 106, which in-turn may limit the voltage sensitivity in known mics.

According to representative embodiments, selective connections to the regions 103-106 are made to provide capacitors in parallel, or capacitors in series, or both. As will be described more fully, this selective connection results in improved voltage sensitivity or charge sensitivity, or both.

Figure 1B:
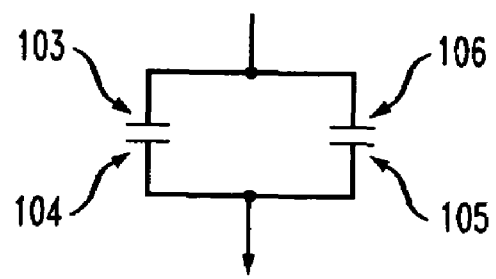
FIG. 1B is an equivalent circuit diagram in accordance with a representative embodiment.

In representative embodiments described herein, gaps are provided between the electrodes located in regions of inflection points. These gaps allow for the selective connection of electrodes to realize capacitors in parallel or in series. For example, with electrodes disposed over both sides of the piezoelectric layer 101 and having gaps in regions of the inflection points 102, 107, connections can be made between electrodes disposed over regions 103 and 106, and between electrodes disposed over regions 104 and 105. In this arrangement, the capacitances are connected in parallel in an equivalent circuit as shown in FIG. 1B. As such, the capacitances add, providing an increased charge, and thus improved charge sensitivity of the mic.

Alternatively, the selective connection can be made to provide capacitors in series. As will be appreciated, two capacitors ($C_1$, $C_2$) connected in series have a total capacitance ($C_T$) given by:

$$C_T = \frac{C_1 * C_2}{C_1 + C_2} \qquad \text{(Eqn. 4)}$$

Figure 1C:
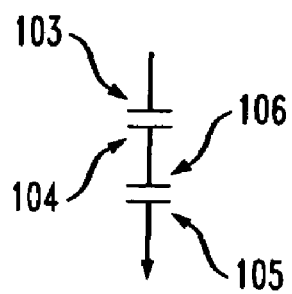
FIG. 1C is an equivalent circuit diagram in accordance with a representative embodiment.

In a series combination, connections may be made between electrodes disposed over regions 104 and 106. FIG. 1C shows a series connection of an equivalent circuit according to this arrangement. As will be appreciated, because the voltages across the capacitors add in a series combination, the voltage sensitivity of the mic is improved.

The selection of parallel or series capacitor combinations is driven by a number of considerations. For example, the sensor circuit (not show) used to convert the electrical signal from the mic to an audio signal is often an important consideration in the selection of connections between the electrodes. Illustratively, some sensor circuits comprise complementary metal oxide semiconductor (CMOS) sensor circuits, which may exhibit noise, such as well-known 1/f (also commonly referred to as flicker noise) or thermal noise (also commonly referred to a Johnson noise). In some embodiments, improving the voltage sensitivity of the mic(s) may be desired to improve the signal to noise ratio (SNR). In this example, the electrodes are connected to provide capacitors in series. Alternatively, in other embodiments, it may be more desirable to sense the charge extracted from the mic. In these embodiments, the electrodes may be connected to provide capacitors in parallel.

Figure 2:
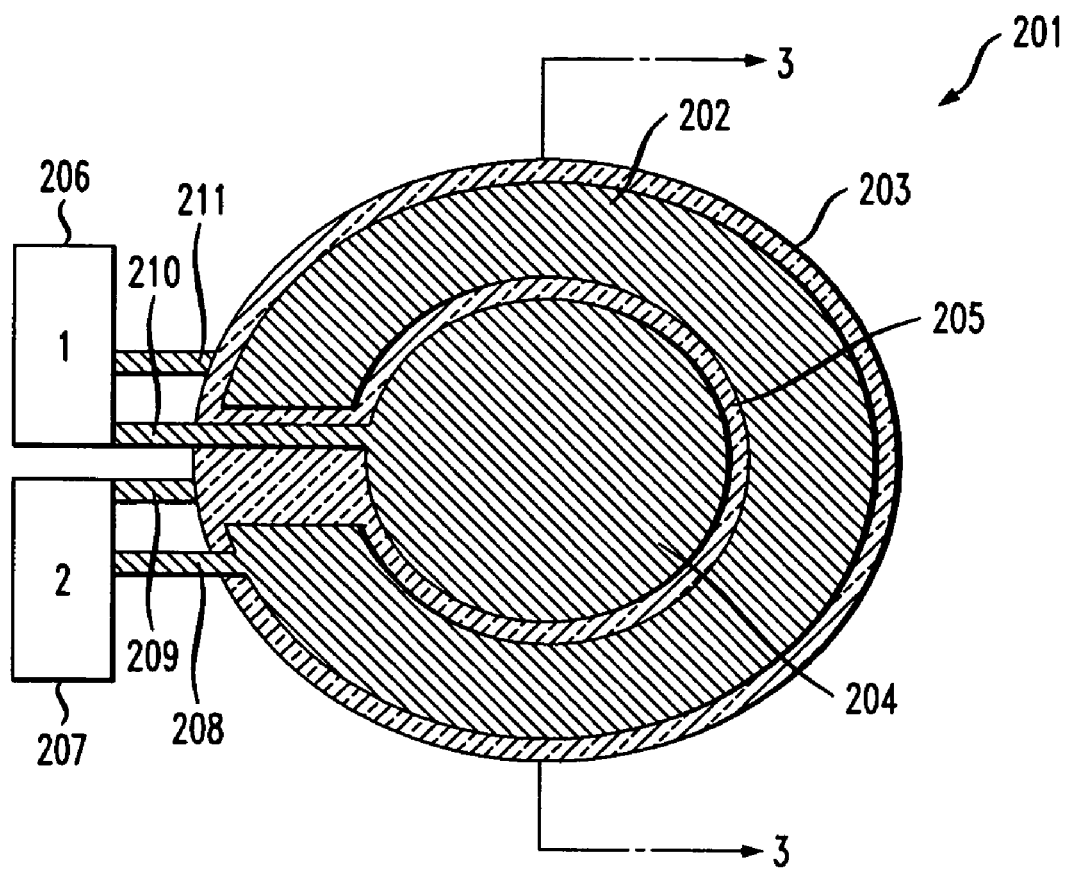
FIG. 2 is a top view of a microphone structure in accordance with a representative embodiment.

FIG. 2 is a top view of a mic structure 201 in accordance with a representative embodiment. The mic structure 201 includes an upper outer electrode 202 and an upper inner electrode 204. A gap 205 is provided between the inner and outer electrodes 204,202 at a region surrounding and including an inflection point of the mic structure 201. The structure 201 also includes a layer 203 of piezoelectric material disposed beneath the upper inner and outer electrodes 204,202 and over lower inner and outer electrodes (not shown in FIG. 2). As described in connection with FIG. 3, lower inner and outer electrodes are substantially identical to electrodes 202, 204, and may be substantially vertically aligned therewith. In other representative embodiments, the lower electrodes may not be substantially vertically aligned with the top electrodes.

In representative embodiments, the gap 205 between the inner and outer electrodes 204, 202 over the upper surface of the piezoelectric layer 203 may have a different width, or relative location, or both, compared to the gap between the inner and outer electrodes on the bottom side of piezoelectric layer 203. Variations in the dimensions of the gap and placement may be used, for example, to provide stress control of the piezoelectric layer 203 or to provide desirable buckling behavior/characteristics of piezoelectric layer 203.

The embodiments described presently include electrodes (and thus mics) having a substantially circular shape, with the inner and outer electrodes being in a concentric relationship. It is emphasized that other annular structures are contemplated. For example, the inner electrode may be square or rectangular in shape, with outer electrode concentric therewith. Alternatively, the electrodes may be elliptical in shape and disposed in a concentric arrangement. Still concentric inner and outer electrodes of other shapes are contemplated.

As noted previously, the gap 205 is provided in a region of an inflection point. As will be appreciated by one of ordinary skill in the art, the inflection points of a clamped oscillating membrane, such as mic structure 201 are dependent upon a number of factors including, but not limited to: the shape of the structure; the materials selected for the structure; the thickness of the materials of the structure; the boundary conditions of the structure; and the applied stress. Illustratively, the inflection points can be determined from finite element simulations to determine bending characteristics over different loading conditions. Notably, these simulations provide the behavior of composite structures with selected boundary conditions (e.g., clamps) and loading conditions (e.g., pressures).

The mic structure 201 includes first and second contact pads 206, 207. The contact pads 206,207 are selectively connected to the electrodes to provide a desired result. For example, contact pad 206 is connected to contacts 210 and 211. Contact 210 connects the upper inner electrode 204 to the pad 206; and contact 211 connects the lower outer electrode (not shown in FIG. 2) to pad 206. Similarly, contact 208 connects the upper outer electrode 202 to contact pad 207; and contact 209 connects the lower inner electrode to contact pad 207. The described connection of electrodes crosses electrodes and provides an illustrative equivalent parallel capacitor circuit.

Figure 3:
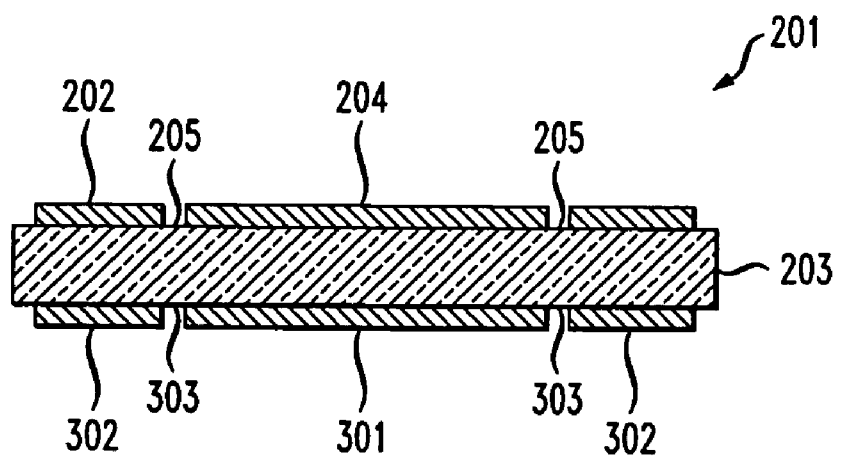
FIG. 3 is a cross-sectional view of the microphone structure of FIG. 2 taken along the line 3-3.

FIG. 3 is a cross-sectional view of the mic structure 201 of FIG. 2, taken along the line 3-3. Many of the details of the mic structure 201 provided in connection with the description of FIG. 2 apply to the present description and are not repeated to avoid obscuring the present description. The structure 201 includes a lower inner electrode 301 and a lower outer electrode 302. The electrodes 301, 302 are substantially similar to electrodes 202,204, and substantially 'line-up' therewith as shown. A gap 303 is provided in a region of an inflection point and between the annularly arranged lower electrodes 301, 302. As shown, the gap 303 is substantially the same as gap 205 and also substantially 'lines up' with gap 205. Selective connections to the upper and lower electrodes may be made with electrical contacts such as contacts 208, 209, 210, 211 (not shown in FIG. 3). As noted previously, the connections to the electrodes 202, 204 and 301,302 can be made to provide series or parallel capacitance circuits, as desired. As noted previously, in other representative embodiments, lower inner and outer electrodes 301,302 may not substantially line-up with, and/or may not have the same width as the upper inner and outer electrodes 204,202.

Figure 4:
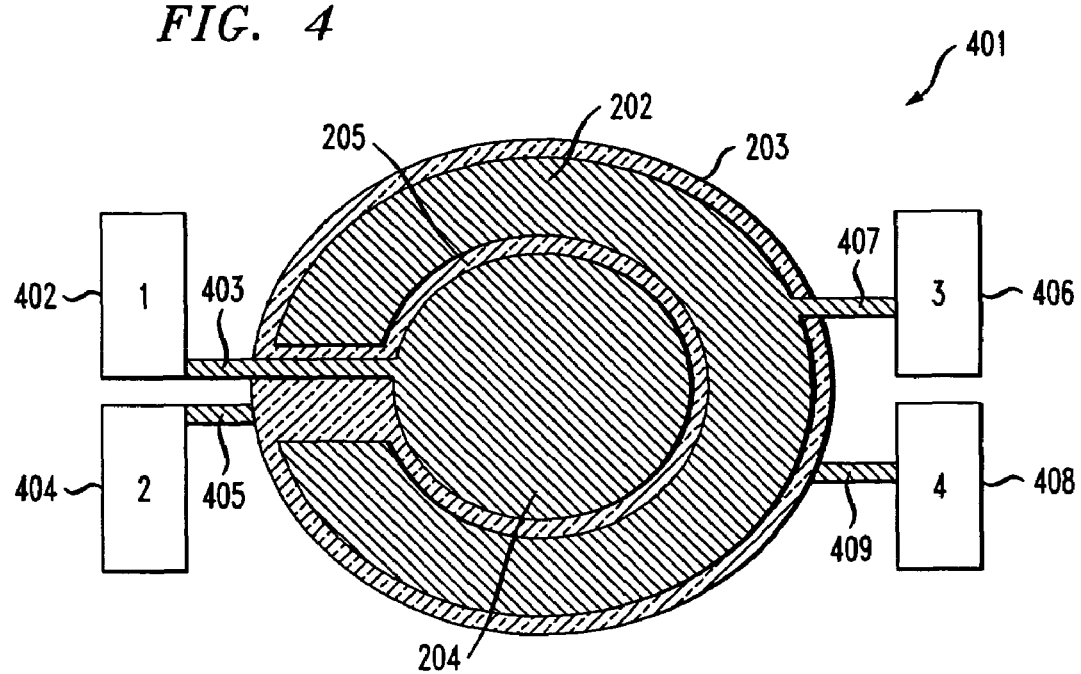
FIG. 4 is a top view of a microphone structure in accordance with a representative embodiment.

FIG. 4 is a top view of a mic structure 401 in accordance with another representative embodiment. Many of the details of the mic structure 201 provided in connection with the description of FIG. 2 apply to the presently described embodiment, and are not repeated to avoid obscuring the present description.

The representative embodiment of FIG. 4 provides the flexibility to effect the connections at the structure 401, or at a point remote to the structure 401. In particular, independent contact pads are provided for each of the upper and lower electrodes. For example, a first contact pad 402 connects to the upper inner electrode 204 via a contact 403; a second contact pad 404 connects to the lower inner electrode 301 (not shown in FIG. 4) via a contact 405; a third contact pad 406 connects to the outer upper electrode 202 via a contact 407; and a fourth contact pad 408 connects to the lower outer electrode 302 (not shown in FIG. 4) via a contact 409.

In the representative embodiments of FIG. 4, the connections between the various upper and lower, and inner and outer electrodes may be made to realize parallel and series capacitor connections as desired. These connections may be made by selective connections (not shown) between the contact pads 402,404,406 and 408. For example, per the embodiment described previously, the upper inner electrode 204 may be connected to the lower outer electrode 302 by making a connection from contact pad 402 to contact pad 408; and upper outer electrode 202 may be connected to lower inner electrode 301 by making a connection from contact pad 406 to contact pad 404. This cross-connection provides a parallel capacitor circuit as described previously. Alternatively, connections of contact pads may be made to provide a series capacitor circuit.

Figure 5A:
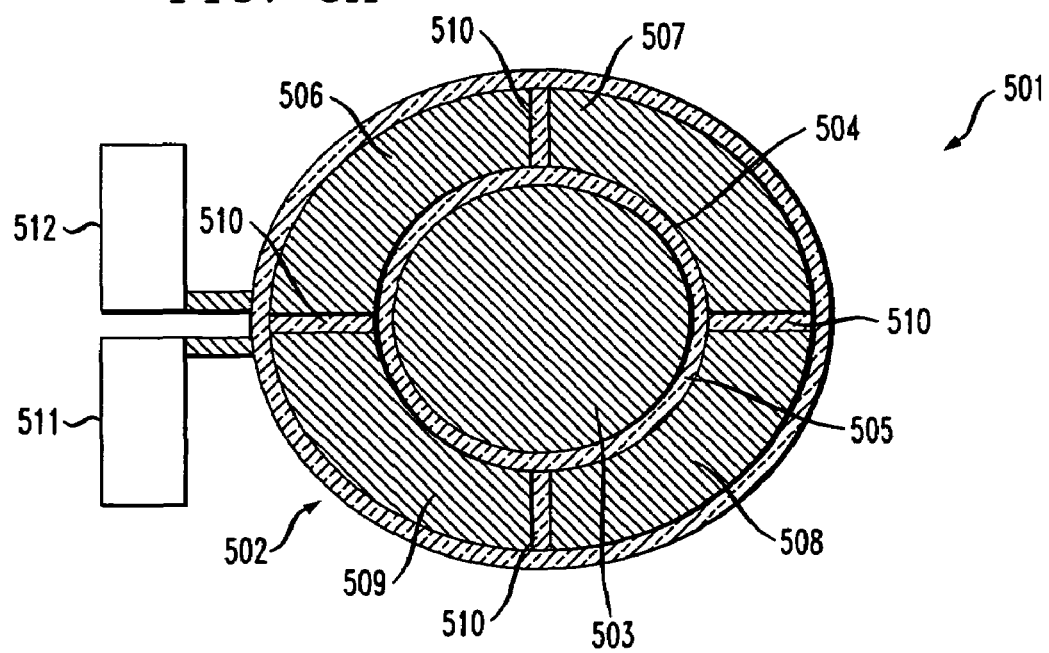
FIG. 5A is a top view of a microphone structure in accordance with a representative embodiment.

FIG. 5A is a top view of a mic structure 501 in accordance with another representative embodiment. Many of the details of the mic structures 201, 401 provided in connection with the description of FIGS. 2-4, respectively, apply to the presently described embodiment, and are not repeated to avoid obscuring the present description.

The structure 501 includes an upper outer electrode 502 and an upper inner electrode 503. A layer 505 of piezoelectric material is provided beneath the upper electrodes 502, 503, and above lower inner and outer electrodes (not shown). A gap 504 is located in a region of an inflection point of the mic structure 501. The structure also includes contact pads 511, 512 that are selectively connected to the electrodes for signal transmission to circuitry (not shown). Notably, the connections of the contact pads 511, 512 to the electrodes of the structure 501 are not shown in FIGS. 5A, 5C and 5D. However, connections to the electrodes as needed and as described above are contemplated. Moreover, more than two contact pads (e.g., as shown in FIG. 4) are also contemplated.

The upper outer electrode 502 comprises sections 506, 507, 508, 509, each separated by section gaps 510. Notably, lower inner and outer electrodes (not shown) are provided beneath the layer 505. In representative embodiments, the lower inner and outer electrodes are substantially identical to the upper electrodes 502,503 with the lower outer electrode comprising a plurality of sections also separated by section gaps. Illustratively, but not essentially, the sections of the lower outer electrode are substantially identical to the section 506-509.

In representative embodiments, the upper and lower inner and outer electrodes substantially 'line-up.' In particular, the upper inner electrode 503 is disposed over and substantially aligned with the lower inner electrode; sections 506-509 of the upper outer electrode 502 are disposed over and substantially aligned with lower outer electrodes and sections thereof; gap 504 is disposed over and substantially aligned with a gap between the lower inner and outer electrodes; and section gaps 510 are disposed over section gaps between the sections of the lower outer electrodes.

In other representative embodiments, sections 506-509 are not disposed over and substantially aligned with the lower electrodes and sections thereof; and/or gap 504 may not be substantially aligned with the gap between the lower inner and outer electrodes; and/or section gaps 510 between upper electrode sections 506-509 may not be substantially aligned with gaps between the sections of the lower electrode. Notably, disposition of gaps that are not substantially aligned may be done to facilitate, for example, film stress control or desirable buckling behavior.

In one representative embodiment, sections 506-509 of the upper outer electrode 502 are selectively connected to the sections (not shown) of the lower outer electrode (not shown) to provide capacitors connected in series. As will be appreciated, in the present embodiment these series connections of sections of the upper and lower outer electrodes provide a four-fold increase in voltage.

In other representative embodiments, more or fewer than four outer electrode sections may be used. In these embodiments, selective connection of the sections in series will result in an increase in voltage commensurate with the number of sections selectively connected in series.

Illustratively, the connections may be made sequentially from an upper outer section to the next lower outer section. For example, section 506 is connected to the section of lower outer electrode section beneath section 507; and section 507 is connected to the lower outer electrode section beneath section 508, and so forth. Connections are then made to contact pads 511,512 for transmission of the signals from the mic structure 501.

Figure 5B:
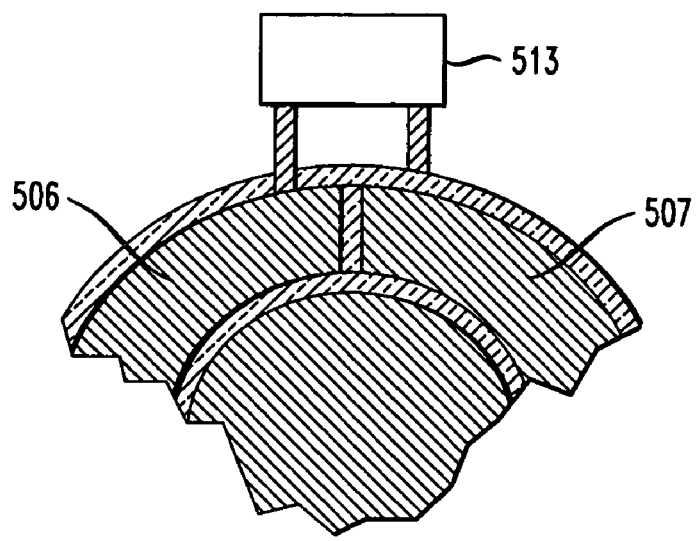
FIG. 5B is a top view of a portion of the microphone structure of FIG. 5A in accordance with a representative embodiment.

The selected connections of upper outer electrode sections to next lower outer sections may be carried out by one of a variety of known connection techniques. For example, FIG. 5B shows a portion of mic structure 501 with an electrical connection 513 from the upper outer section 506 to a lower outer section beneath section 507. The electrical connection 513 may be made using a suitable conductive material, for example the same material as used for the electrodes. Similar connections may be used to connect an upper outer section with the lower outer electrode beneath the next upper section. Alternatively, the lower outer section beneath section 506 may be selectively connected with upper outer section 507; the lower outer section beneath section 507 may be selectively connected to upper outer section 508, and so forth in the same manner.

The embodiment described in connection with FIG. 5B illustrates but one way to selectively connect the outer sections to one another to provide a series capacitance connection. As will be appreciated, in alternative embodiments the sections of the outer electrodes and the inner electrode may be selectively connected to provide a parallel capacitance connection or may be selectively connected to provide a combination of capacitors in series and capacitors in parallel, as desired. Moreover, the desired magnitude of series capacitance and the magnitude of parallel capacitance are application driven and are also effected by the selective connections of upper and lower outer sections and upper and lower inner electrodes.

As will be appreciated by one of ordinary skill in the art, the combination of series and parallel capacitor circuits may be useful to provide a desired amount of voltage sensitivity and a desired amount of charge sensitivity. In yet another embodiment, the connections around the upper outer sections and lower outer sections are essentially the same as described; however, section 507 is not connected to section 508. Rather, the section of the lower inner electrode beneath section 503 is connected to the section of the lower outer electrode beneath section 507; and the upper inner electrode 503 is connected to section 508.

Alternatively, upper inner electrode section 503 may be connected to section 507, and the lower inner electrode beneath section 503 may be connected to the lower outer electrode beneath section 508. These connections account for the switch of polarity between the inner and outer electrodes such that the inner electrode is connected either in series or in parallel with the outer electrodes, thereby increasing voltage sensitivity or capacitance.

In some representative embodiments, connections may be selectively made such that the upper and/or lower inner electrode is in parallel with at least one of the sections of the upper and/or lower outer electrode. In some embodiments, sections of upper and/or lower outer electrodes may be selectively connected to be in parallel with other sections of the upper and/or lower outer electrodes and in series with additional sections of upper and/or lower outer electrode regions.

Figure 5C:
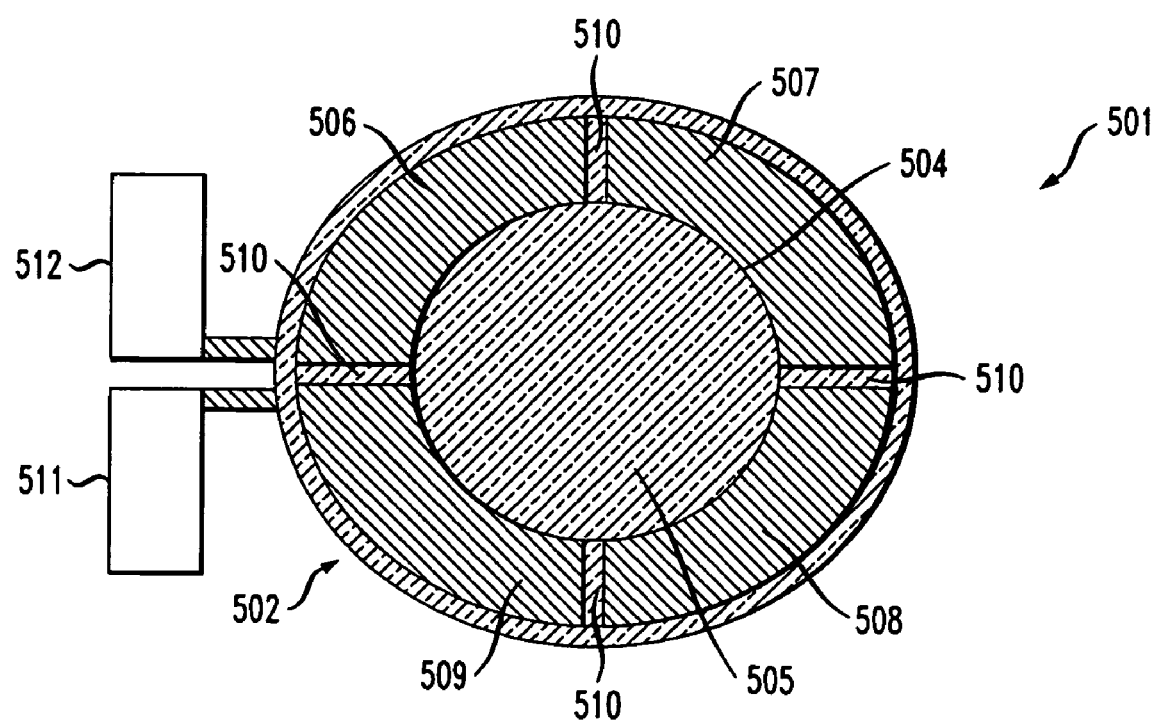
FIGS. 5C and 5D are top views of microphone structures in accordance with representative embodiments.

FIG. 5C is a top view of mic structure 501 in accordance with another representative embodiment. Many of the details of the mic structures provided in connection with the description of FIGS. 2, 4, 5A and 5B apply to the presently described embodiment, and are not repeated to avoid obscuring the present description.

In the presently described embodiment, the inner electrode 503 and the inner electrode beneath the inner electrode 503 are foregone, and connections are made sequentially from a lower outer section to the next upper outer section. In such an embodiment, the outer section beneath outer upper section 506 is connected to upper outer section 507; the outer section beneath section 507 is connected to upper outer section 508, and so forth. Alternatively, connections are made from an upper outer section to the next lower section. As will be appreciated, this provides a series connection of capacitors. Alternatively, parallel connections may be made by selective connection of the sections 506-509. Connections are then made to contact pads 511,512 for transmission of the signals from the mic structure 501.

Figure 5D:
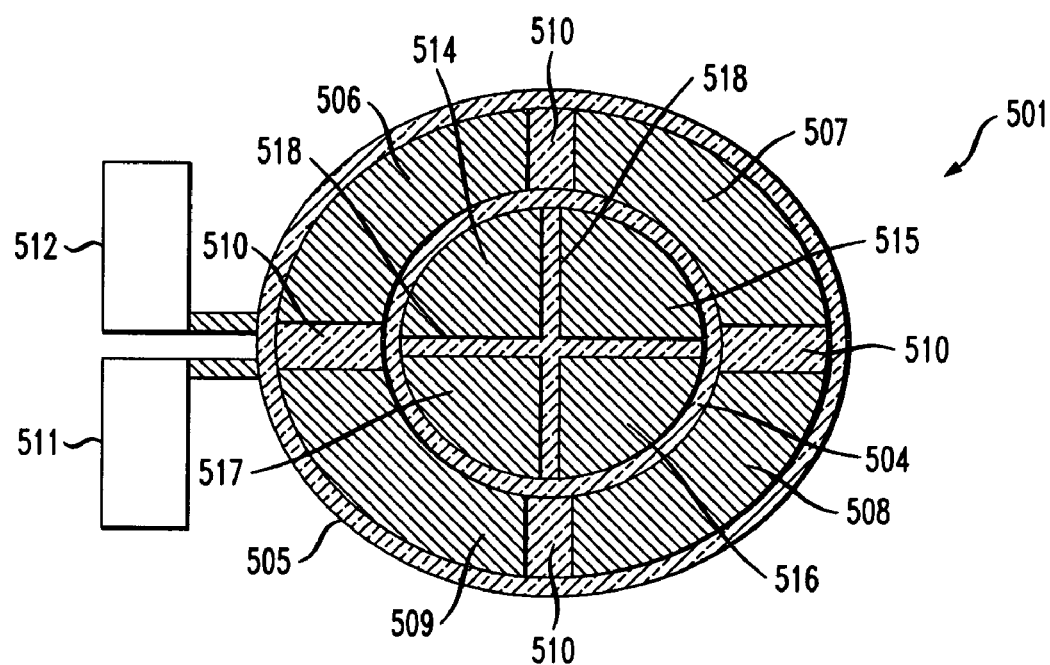

FIG. 5D is a top view of mic structure 501 in accordance with another representative embodiment. Many of the details of the mic structures provided in connection with the description of FIGS. 2,4, 5A-5C apply to the presently described embodiment, and are not repeated to avoid obscuring the present description.

In the present embodiment, the upper inner electrode comprises four inner upper sections 514, 515, 516, 517, which are separated by gaps 518. Similarly, the lower inner electrode disposed beneath the upper inner electrode may also comprise a plurality of sections. These sections are also separated by gaps. The inner electrode sections 514-517 and electrode sections beneath 514-517 may be selectively connected to outer electrode sections 506-509 in parallel, series or a combination thereof. Alternatively, inner electrode sections 514-517 and electrode sections beneath 514-517 may be selectively connected with each other in parallel, series, or a combination thereof.

In alternative embodiments more or fewer than four outer electrode sections and/or more or fewer than four inner electrode sections may be used. In these embodiments, the upper inner and outer electrode sections (and electrode sections beneath the upper inner and outer electrode sections) may be selectively connected to form circuits comprising capacitors in parallel, series, or combination thereof.

Figure 6:
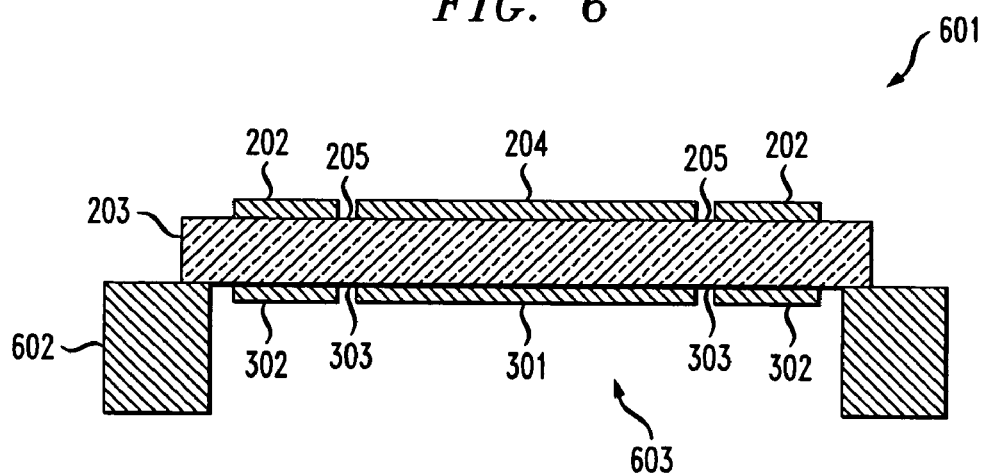
FIG. 6 is a cross-sectional view of a microphone structure in accordance with a representative embodiment.

FIG. 6 is a cross-sectional view of a mic structure 601 in accordance with a representative embodiment. Many of the features of mic structures described in connection with the embodiments of FIGS. 2-5 apply to or may be applied to the presently described embodiment, and are not repeated to avoid obscuring the present description.

In the present embodiment, a substrate 602 is provided. The lower inner and outer electrodes 301, 302 are recessed into a cavity 603 formed through the substrate. The layer 203 of piezoelectric material is formed over the substrate 602, and the upper inner and outer electrodes 204,202 are disposed over the substrate 602. The cavity 603 allows suitable vibration of the membranes of the mic due to mechanical (audio) signals. Moreover, vents are usefully provided through or around the mic (e.g., through the layer 203 or through the substrate or around the layer 203) to provide pressure equalization with the ambient. Further details of the use and fabrication of the cavities are provided in U.S. patent application Ser. No. 11/588,752 entitled "PIEZOELECTRIC MICROPHONES" to R. Shane Fazzio, et al. and filed on Oct. 27, 2006. The disclosure of this application is specifically incorporated herein by reference.

As will be appreciated by one skilled in the art, packaging and selective acoustic isolation are often useful in mic applications. The packaging may be wafer scale packaging as described in the referenced U.S. Patent Application. Moreover, acoustic isolation may be provided using isolation structures as described in the referenced U.S. Patent Application.

Figure 7:
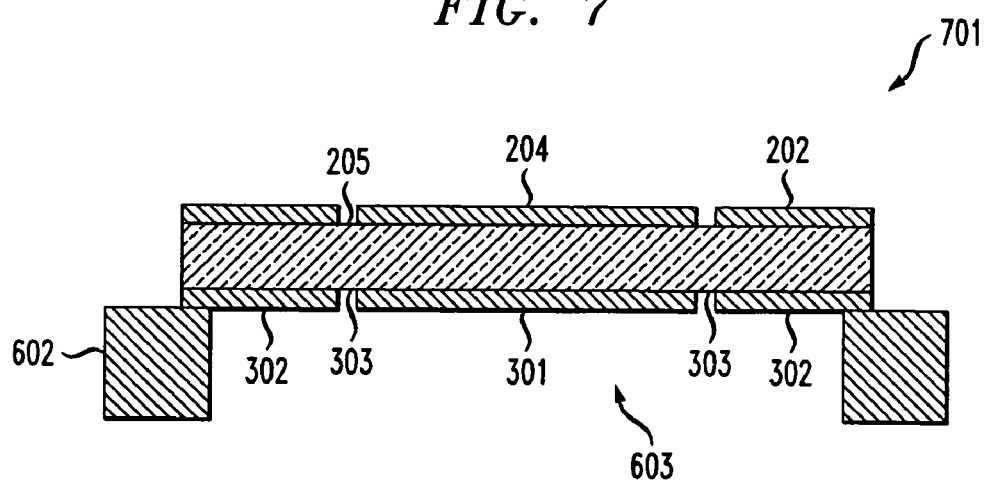
FIG. 7 is a cross-sectional view of a microphone structure in accordance with a representative embodiment.

FIG. 7 is a cross-sectional view of a mic structure 701 in accordance with a representative embodiment. Many of the features of mic structures described in connection with the embodiments of FIGS. 2-6 apply to or may be applied to the presently described embodiment, and are not repeated to avoid obscuring the present description.

In the present embodiment, the lower outer electrode 302 is disposed over the substrate. The cavity 603 allows suitable vibration of the membranes of the mic due to mechanical (audio) signals. Moreover, vents are usefully provided through or around the mic to provide pressure equalization with the ambient. In addition, packaging and acoustic isolation may also be provided. Again, details of the function and fabrication of the cavity 603, the vents, and packaging and isolation structures may be found in the referenced U.S. Patent Application.

FIGS. 6 and 7 show two ways to position the mic structure over the cavity in the substrate 601. The selection of the positioning mic structure over the cavity may be selected to influence mechanical and electrical properties of the mic structure. This can facilitate performance optimization.

In the representative embodiments described herein, voltage sensitivity and charge sensitivity of piezoelectric mics are improved compared to known structures by reducing charge-normalization found in single electrode structures. As will be appreciated by one of ordinary skill in the art, many variations that are in accordance with the present teachings are possible and remain within the scope of the appended claims. These and other variations would become clear to one of ordinary skill in the art after inspection of the specification, drawings and claims herein. The invention therefore is not to be restricted except within the spirit and scope of the appended claims.

The invention claimed is:

1. A transducer structure, comprising:
   an upper inner electrode;
   an upper outer electrode;
   a lower inner electrode;
   a lower outer electrode;
   a layer of piezoelectric material disposed between the upper electrodes and the lower electrodes;
   an upper gap between the upper inner electrode and the upper outer electrode; and
   a lower gap between the lower inner electrode and the lower outer electrode, wherein the upper gap and the lower gap are located to substantially coincide with respective inflection points of the transducer structure during oscillation.

2. A transducer structure as claimed in claim 1, wherein the upper and lower inner electrodes and the upper and lower outer electrodes form plates of capacitors.

3. A transducer structure as claimed in claim 2, wherein the upper electrodes and the lower electrodes are selectively connected to form capacitors in parallel.

4. A transducer structure as claimed in claim 3, further comprising a first contact pad and a second contact pad, wherein the upper electrodes and the lower electrodes are selectively connected to the first and second contact pads to provide the parallel capacitors.

5. A transducer structure as claimed in claim 2, wherein the upper electrodes and the lower electrodes are selectively connected to form capacitors in series.

6. A transducer structure as claimed in claim 5, further comprising a first contact pad and a second contact pad, wherein the upper electrodes and the lower electrodes are selectively connected to the first and second contact pads to provide the series capacitors.

7. A transducer structure as claimed in claim 1, wherein the inner and outer electrodes are substantially concentric.

8. A transducer structure as claimed in claim 1, wherein the inner and outer electrodes are substantially circular.

9. A transducer structure as claimed in claim 1, further comprising:
   a substrate having a first side and a second side;
   a cavity in the substrate from the first side to the second side, wherein the upper and lower electrodes and the piezoelectric layer are disposed over the cavity.

10. A transducer structure as claimed in claim 1, wherein the upper and lower outer electrodes each comprise a plurality of sections, which are separated by section gaps.

11. A transducer structure as claimed in claim 10, wherein the section gaps are selectively connected to provide capacitors connected in series.

12. A transducer structure as claimed in claim 1, wherein the inner electrode further comprises a plurality of sections, which are separated by section gaps.

13. A transducer structure, comprising:
an upper annular electrode;
a lower annular electrode; and
a layer of piezoelectric material disposed between the upper and lower electrodes, wherein the upper and the lower annular electrodes each comprise a plurality of sections, which are separated by section gaps located to substantially coincide with respective inflection points of the transducer structure during oscillation.

14. An electronic device comprising:
a transducer structure, which further comprises:
an upper inner electrode;
an upper outer electrode;
a lower inner electrode;
a lower outer electrode;
a layer of piezoelectric material disposed between the upper electrodes and the lower electrodes;
an upper gap between the upper inner electrode and the upper outer electrode; and
a lower gap between the lower inner electrode and the lower outer electrode, wherein the upper gap and the lower gap are located to substantially coincide with respective inflection points of the transducer structure during oscillation.

15. An electronic device as claimed in claim 14, wherein the upper and lower inner electrodes and the upper and lower outer electrodes form plates of capacitors.

16. An electronic device as claimed in claim 15, wherein the upper electrodes and the lower electrodes are selectively connected to form capacitors in parallel.

17. An electronic device as claimed in claim 15, wherein the upper electrodes and the lower electrodes are selectively connected to form capacitors in series.

18. An electronic device as claimed in claim 14, wherein the inner and outer electrodes are substantially concentric.

19. An electronic device as claimed in claim 18, wherein the inner and outer electrodes are substantially circular.

20. An electronic device as claimed in claim 14, wherein the electronic device comprises one or more of: a mobile phone; a portable digital assistant (PDA); a portable video recorder; a portable music recorder; a portable voice recorder; a portable camera; a computer; a remote control; and a laptop computer.

21. An electronic device as claimed in claim 14, wherein the upper electrodes and the lower electrodes are selectively connected to first and second contact pads to provide the series capacitors.

22. An electronic device as claimed in claim 14, wherein the upper electrodes and the lower electrodes are selectively connected to the first and second contact pads to provide the parallel capacitors.

* * * * *